United States Patent [19]

Hemann et al.

[11] Patent Number: 5,188,860
[45] Date of Patent: Feb. 23, 1993

[54] PROCESS FOR THE PRODUCTION OF A FIBER CONTAINING CEREAL PRODUCT

[75] Inventors: Donald R. Hemann, Kirkwood; Arthur C. Hamilton, Sr., Flordell Hills, both of Mo.

[73] Assignee: Ralston Purina Company, St. Louis, Mo.

[21] Appl. No.: 789,250

[22] Filed: Nov. 7, 1991

[51] Int. Cl.$^5$ .............................................. A23L 1/164
[52] U.S. Cl. ..................................... 426/560; 426/454; 426/459; 426/620; 426/621
[58] Field of Search ................ 426/454, 560, 618–620, 426/621, 459

[56] References Cited

U.S. PATENT DOCUMENTS

| | | | |
|---|---|---|---|
| 4,315,954 | 2/1982 | Kuipers et al. | 426/621 |
| 4,350,714 | 9/1982 | Duvall | 426/621 |
| 4,526,800 | 7/1985 | Howard | 426/621 |
| 4,759,942 | 7/1988 | Von Fulger | 426/621 |
| 4,777,045 | 10/1988 | Vanderveer et al. | 426/621 |
| 4,834,989 | 5/1989 | Bolles et al. | 426/28 |
| 4,873,110 | 10/1989 | Short et al. | 426/621 |
| 4,938,982 | 7/1990 | Howard | 426/621 |
| 5,024,996 | 6/1991 | Ringe | 514/54 |
| 5,026,689 | 6/1991 | Ringe et al. | 514/57 |

FOREIGN PATENT DOCUMENTS 2039204 8/1980 United Kingdom .

Primary Examiner—Jeanette Hunter
Assistant Examiner—Mary S. Mims
Attorney, Agent, or Firm—Virgil B. Hill

[57] ABSTRACT

The present invention relates to an improved process for the production of a fiber containing ready to eat cereal product of improved texture and appearance. The process involves the addition of a fiber source to a moistened and cooked grain mixture during the pelletization of the mixture. The pellets of the fiber containing mixture are then formed into a suitable shape for the ready to eat cereal product, such as a flake. The addition of the fiber source during pelletization of the mixture avoids any textural and appearance problems that might result if the fiber is added during the cooking or tempering step.

20 Claims, No Drawings

PROCESS FOR THE PRODUCTION OF A FIBER CONTAINING CEREAL PRODUCT

BACKGROUND OF THE INVENTION

The present invention relates to a process for the production of a fiber containing cereal product of improved texture and appearance.

Ready to eat cereal products containing an added fiber source are well known as described in U.S. Pat. Nos. 5,026,689 and 4,834,989. The introduction of certain types of dietary fiber products, such as soy fiber, into cereal products sometimes will result in a processing problem, in that if the fiber product is added during cooking the fiber product competes with the moisture used for cooking of the cereal grains, thereby forming "balls" or aggregates of fiber which are visually apparent in the cereal product after the forming process. This is a particular problem in the production of flaked cereals, in which such lumps or aggregates of fiber are readily apparent.

While this problem is not limited exclusively to soy fiber products and their addition to flaked ready to eat cereal products, soy fiber products are highly water absorbent and their addition during cooking of the grains often results in the above described processing problem. As noted above, ready to eat cereal products are typically formed into some type of coherent shape such as a flake, following cooking of the grains. A forming step, such as flaking, is performed by pelletizing of the cooked and moistened cereal grains and then passing the pellets through adjacent pressurized rolls in order to produce flakes of the product. An unexpected solution to the above processing problem was achieved in the present invention by adding the fiber product in dried and unhydrated form during the pelletizing and prior to the forming step. Addition of the fiber at this point in the process provides a dramatic improvement in the visual appearance of the fiber containing formed product. Not only are the texture and appearance of the ready to eat cereal product improved but the color is much lighter and more desirable than when the fiber is added during cooking and prior to pelletizing.

It is therefore an object of the present invention to provide an improved process for the production of a fiber containing cereal product of improved texture and appearance.

It is also an object of the present invention to provide a process for the production of a fiber containing flaked cereal product of improved texture and appearance.

These and other objects of the present invention will be readily apparent from the following specific description of the invention.

SUMMARY OF THE INVENTION

A process for the production of a high fiber cereal product is disclosed in the present invention in which grain particles are moistened to a total moisture content of about 20 to 30% and then steamed to cook the grain particles. Following cooking, an unhydrated fiber source, such as soy fiber is added to the moistened and cooked grain particles to form a fiber containing mixture. This fiber containing mixture is then pelletized and tempered at a temperature and for a period of time sufficient to uniformly distribute the added moisture. The pellets are then processed into a suitable shape by a process such as flaking in order to form a ready to eat cereal product of improved texture and appearance. The resultant product may then be dried if necessary by the use of a conventional drying oven.

DESCRIPTION OF THE PREFERRED EMBODIMENTS

The present invention provides a process for making a formed cereal product from a plurality of grain types and the present invention is not limited to any specific type of grain as the primary ingredient of the ready to eat cereal product of the present invention. Various grains may be used in the present invention including, rice, corn, wheat, oats, barley, rye and buckwheat, as well as combinations thereof. The uncooked grains are initially cut into a size of less than about ¼ in ch size which typically provides a particle size sufficient for the present process. The particular process used to subdivide or cut whole grain particles is not critical to the present invention and is generally done for the purpose of providing a uniform particle size for complete cooking of the grain particle.

It is not uncommon, but not critical to also add additional ingredients to the grain particles, prior to cooking which individually or in combination contribute to the flavor and appearance of the ready to eat cereal product of the present invention. Typical ingredients include salt, syrups such as malt syrup or corn syrup, and sweeteners such as sugar or artificial sweeteners. Typical but non-limiting amounts of these ingredients are from about 0 to 20% by weight of the ready to eat cereal product and preferably about 5 to 8% by weight. The relative amount of cut cereal grains which used in the present invention is about 50 to 70% by weight of the ready to eat cereal product. Water is then added to the mixture of grains and other ingredients in an amount sufficient to provide a total moisture content in the mixture of about 20 to 30% by weight.

This moistened mixture is then placed in a conventional cooker to which steam and elevated pressure may be applied in order to both steam and cook the mixture. Steaming of the mixture may be carried out by the addition of steam to the cooker so that a temperature of about 242 to 262° F. and a pressure of about 11 to 22 psi in the cooker is achieved. These particular conditions are not critical to the present invention, and represent typical cooking conditions in order to provide uniform cooking of the grain particles. A typical time for this step is about 45 to 120 minutes although the exact time is not critical and the minimum time needed is that necessary for substantially complete cooking of the cereal grains.

The cooked grain particles following cooking generally has a moisture content of about 28 to 40% by weight and the product is at a temperature of about 190 to 212° F.

Following cooking and steaming of grain particles, they are then pelletized in a suitable forming apparatus to form pellets that can then be further processed and formed into a shape suitable as desired for the ready to eat cereal product, such as a flake. It is at this point in the process, that it has been determined it is important to add the fiber source in order to avoid any processing problem which might result if the fiber material is added during the cooking step. The fiber source is generally added to the mixture in unhydrated or dried form, that is to say at a moisture content which is not greater than about 9% by weight, such as in the form of a powder or the like, and is added to the grains to form a fiber containing mixture. The type of fiber that may be used is not critical to the practice of the present invention and can include various types of bran, as well as psyllium or other fiber sources that are approved for food use and typically used to increase the fiber content of ready to eat cereal products. A preferred fiber source for use in the present invention is soy fiber, which is a desirable and beneficial source of fiber, that provides the nutritional and therapeutic effects which are normally associated with the addition of fiber sources to cereal products or products of this type. Typical and specific types of soy fibers include the various Fibrim soy fiber products, such as "Fibrim 1200, 1250, 1260, and 1265., all of which are available from Protein Technologies International, Inc., Checkerboard Square, St. Louis, MO 63164. These products generally provide a dietary fiber level of at least 75% by weight. This product is also dried and is sold in a powdered or ground form for convenient addition to a variety of food products. The amount of fiber that is used in the present invention is that sufficient to provide a dietary fiber content in the ready to eat cereal product of at least about 10% by weight which represents an added amount in the case of soy fiber of about 8 to 25% by weight of the ready to eat cereal mixture.

The fiber source is added to the grain mixture at the time the grain mixture is pelletized by the addition of the fiber in unhydrated or dried form to the mixture. The addition of the fiber source at the time of pelletization of the mixture represents the most important aspect of the present invention, since the addition of the fiber source at this point of time avoids the processing problems involved with the addition of a fiber source during cooking or steaming of the grain mixture. As previously noted, a particular problem results with the production of a flaked ready to eat cereal product, in which the balling up or the inclusion of aggregates of the fiber are particularly apparent when the fiber source is added during cooking. These problems are substantially avoided when the fiber source is added during the pelletization step.

Pelletization of the fiber containing mixture is then carried out under conditions of elevated pressure and temperature to form pellets of the mixture having an approximate moisture level of about 24 to 36% by weight. Typical conditions for the pelletization step include a product temperature of about 120° F to 200° F and a pelletizer pressure of about 250 to 1000 psig.

Following pelletization, it is desirable but not critical to temper the pellets to informally distribute moisture prior to the forming steps. Tempering may also be carried out prior to pelletization if desired, although this is not preferred in the present process. Typical, but nonlimiting conditions for tempering include reducing the moisture content of the wet pellets by partial drying and maintaining the pellets at a total moisture content of about 20 to 30% by weight and usually at ambient temperature, specifically at a product temperature of about 100 to 150° F.

The pelletized mixture may then be processed into a suitable shape by a process which may include flaking or any other type of forming process that is typically used for the production of a ready to eat cereal product. After formation of the ready to eat cereal particle it may be further dried to a shelf stable moisture level in a forced air oven or similar device and the particular conditions for the drying step are not critical to the practice of the present invention.

The following examples represent specific but nonlimiting embodiments of the present invention:

EXAMPLE 1

A ready to eat cereal product having a fiber content of about 12% was prepared from the following formula by the process described below.

| Ingredients | Lbs. | % by Weight |
|---|---|---|
| Corn Grits #12 | 300 | 56.44 |
| Soy Fiber ("Fibrim 1250" available from Protein Technologies International, St. Louis, MO (75% dietary fiber) | 50 | 9.41 |
| Salt | 2.0 | 0.38 |
| Malt Syrup | 9.5 | 1.79 |
| Sugar (White) | 20.0 | 3.76 |
| Water (150° F.) | 150.0 | 28.22 |

The corn grits and soy fiber were preblended in a mixer and then placed in a mixer cooker. The remaining ingredients are added and blended in the grain mixture. The ingredient mixture is then steamed and cooled at 18 psi for 80 minutes. The cooker was operated at about 1.5 r.p.m. to blend the mixture during cooking. At the time the cooker was opened it was noticed that small balls of the soy fiber appeared on the surface of the grits. The cooked mixture had a moisture content of about 32% by weight. The cooked mixture was pelletized in a pelletizer to produce 3/16 inch pellets which had a moisture content of about 36.3% by weight and were at a temperature of about 120 to 160° F. The wet pellets were then air transferred to a dryer operated at an air temperature of 220-270° F., wherein the pellets are retained at this temperature for about 2-3 minutes in order to reduce the moisture level of the pellets to about 24% by weight. The partially dried pellets were allowed to temper at ambient temperature for about 2 hours. The pellets were then passed through flaking rolls to produce a flake with an approximate thickness of 0.017 inches. The flakes after drying to a moisture level of 1.5% had an unsatisfactory texture with a "gritty" appearance having small aggregate of fiber appearing on the surface.

EXAMPLE 2

A ready to eat cereal product having a fiber content of about 12% was prepared from the following formula by the process described below.

| Ingredient | Lbs. | % by Weight |
|---|---|---|
| Corn Grits #12 | 300.00 | 61.29% |
| Soy Fiber ("Fibrim 1250" available from Protein Technologies International, St. Louis, MO) | 71.78 | 14.66% |
| Salt | 7.50 | 1.53 |
| Malt Syrup | 2.00 | 0.41 |
| Corn Syrup 42DE | 0.23 | 0.05 |
| Water (150° F.) | 85.50 | 17.47 |
| Sugar | 22.50 | 4.60 |

The product was generally produced as described in Example I except that the dry, unhydrated soy fiber material in the above formula was added directly to the pelletizer with the moist cooked mixture. The pellets had a moisture content of about 34.2% by weight immediately after pelletization and a moisture content of about 29.1% after partial drying.

The pellets with the fiber were then flaked and dried to a moisture content of about 1.6% by weight. The flakes had an excellent appearance and texture without the "gritty" appearance obtained when the fiber was added during cooking as described in Example I. The flakes also had a light and desirable color as compared to the flakes of Example 1.

The present invention is intended to cover the present process and product together with all reasonable and equivalent variations thereto, defined only by the appended claims.

What is claimed:

1. A process for the production of a fiber containing cereal product comprising:
   (a) moistening grain particles and cooking said particles;
   (b) adding an unhydrated fiber source to the cooked grain particles during pelletization of the particles to form a fiber containing mixture; and
   (c) pelletizing and forming said mixture into a high fiber cereal product of improved texture and appearance.

2. A process as set forth in claim 1 wherein the fiber source is a soy fiber.

3. A process as set forth in claim I wherein the grain particles are moistened to a total moisture content of about 20-30% by weight.

4. A process as set forth in claim I wherein the grain particles are present in an amount of about 50 to 70% by weight of the cereal product.

5. A process as set forth in claim I wherein the fiber source is added in an amount sufficient to provide a dietary fiber content of at least about 10% by weight in the ready to eat cereal product.

6. A process as set forth in claim 1 wherein cooking is carried out at a temperature of about 242 to 262° F., a pressure of about 11 to 22 psi for about 45 to 120 minutes.

7. A process as set forth in claim 1 wherein the pellets of the fiber containing mixture are tempered before forming.

8. A process as set forth in claim 7 wherein the pellets are partially dried prior to tempering.

9. A process as set forth in claim 8 wherein tempering of the pellets are carried out at a moisture level of about 20 to 30% by weight, at ambient temperature, for about 25 to 240 minutes.

10. A process as set forth in claim 8 wherein the pellets are dried to a total moisture level of about 20 to 30% by weight.

11. A process as set forth in claim 1 wherein the pellets are formed into flakes.

12. A process as set forth in claim 1 including the step of drying the formed cereal product to a shelf stable moisture content.

13. A process for the production of a fiber containing cereal product comprising;
   (a) moistening grain particles to a total moisture content of about 20 to 30% by weight and cooking said particles;
   (b) adding an unhydrated fiber to the cooked grain particles in an amount sufficient to provide a dietary fiber content of at least about 10% by weight of the cereal product during pelletization of the particles to form a fiber containing mixture;
   (c) pelletizing and forming said pellets into flakes having an improved texture and appearance.

14. A process as set forth in claim 12 wherein the grain particles are present in an amount of about 50 to 70% by weight of the cereal product.

15. A process as set forth in claim 12 wherein cooking is carried out at a temperature of about 242 to 262° F, a pressure of about 11 to 22 psi, for about 45 to 120 minutes.

16. A process as set forth in claim 13, wherein the pellets are partially dried prior to tempering.

17. A process as set forth in claim 12 wherein tempering of the pellets is carried out at a total moisture level of about 20 to 30% by weight, at ambient temperature, for about 25 to 240 minutes.

18. A process as set forth in claim 16 wherein the pellets are dried to a moisture level of about 20 to 30% by weight.

19. A process as set forth in claim 13 including the step of drying the flake to a shelf stable moisture content.

20. A process as set forth in claim 13 wherein the fiber is a soy fiber.

* * * * *